Feb. 17, 1959  J. SCHOR  2,873,780
PIE CUTTER
Filed Nov. 12, 1954  2 Sheets-Sheet 2
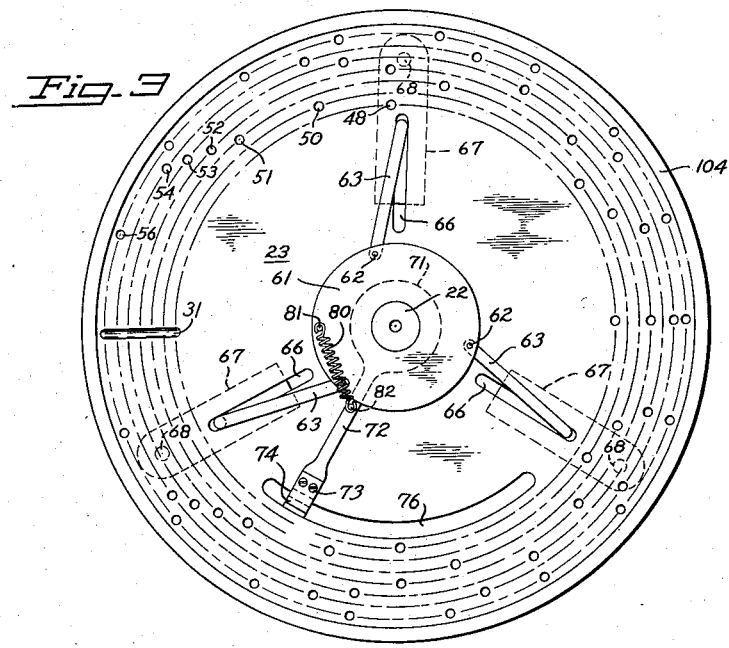
INVENTOR
JOSEPH SCHOR
BY
Charles S. Evans
his ATTORNEY

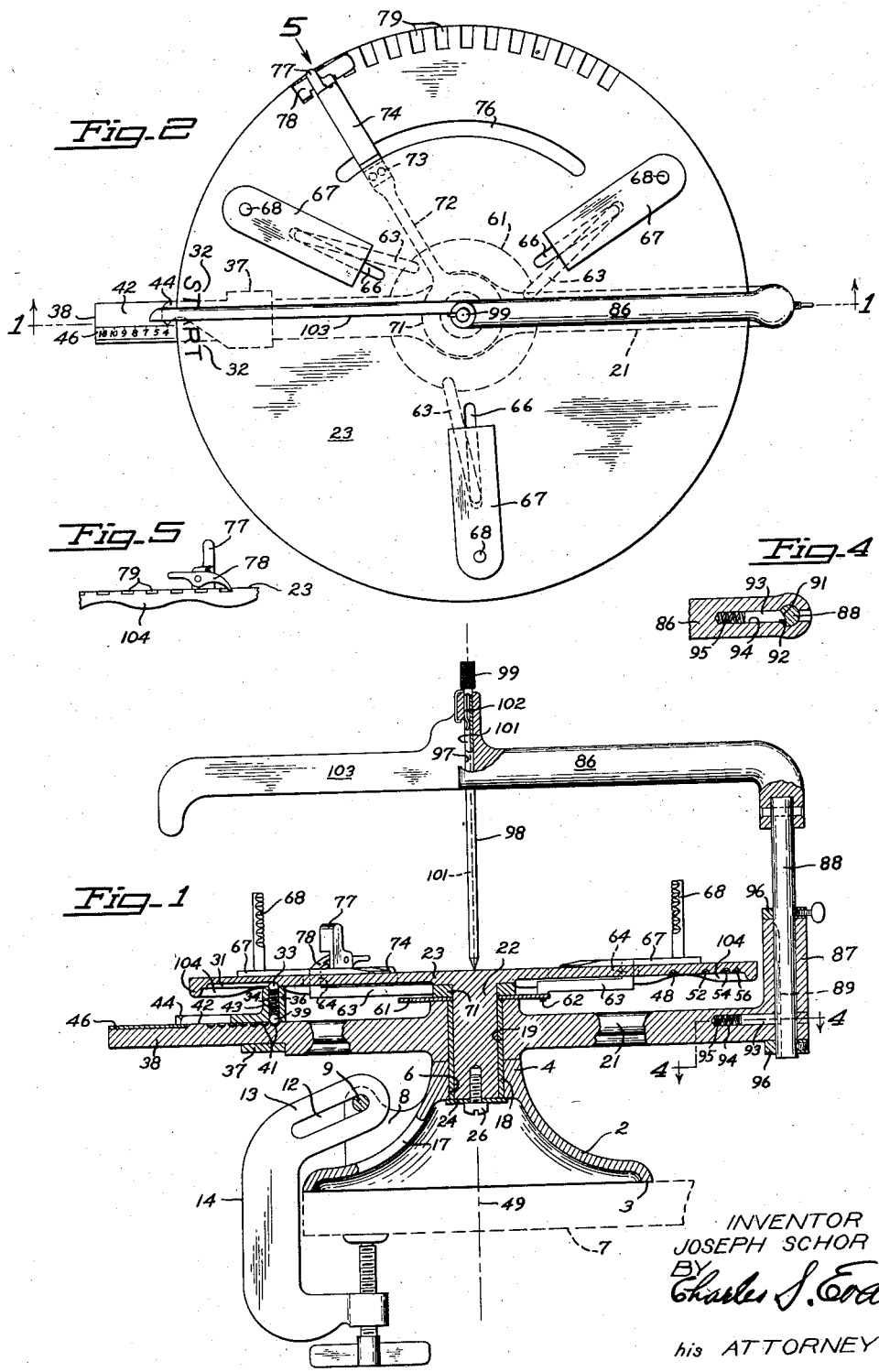

United States Patent Office 2,873,780
Patented Feb. 17, 1959

2,873,780

PIE CUTTER

Joseph Schor, San Francisco, Calif.

Application November 12, 1954, Serial No. 468,446

3 Claims. (Cl. 146—150)

My invention relates to food cutting devices; and more particularly to a device for cutting pies and cakes and other circularly formed food products.

One of the objects of my invention is the provision of a device which facilitates cutting such food products as circular pies and cakes into any selected number of equal sectors.

Another object is the provision in a device of the character described of means for holding the pie or cake accurately centered thereon while it is being cut.

Still another object of the invention is the provision in such a device, of means for guiding the knife in making the cuts.

Another object of the invention is the provision of a pie and cake cutting device which accurately positions the food product at successive cutting positions corresponding to the position of a cutting guide thereon.

Another object is the provision of spring-held adjustment devices by which the size of the sector to be cut is visually determined, and stop means adjusted accordingly.

Other objects of the invention, together with the foregoing, will be set forth in the following description of the preferred embodiment of my invention which is illustrated in the accompanying drawings. It is to be understood that I do not limit myself to the showing made by the said description and drawings, as I may adopt variations of my preferred form within the scope of the appended claims.

Referring to the drawings:

Fig. 1 is a vertical half section of my device partly in elevation. The plane of the section is indicated by the line 1—1 of Fig. 2.

Fig. 2 is a plan view of my device.

Fig. 3 is a bottom view of the turntable removed from the base.

Fig. 4 is a fragmentary vertical sectional view taken in the plane indicated by the line 4—4 of Fig. 1.

Fig. 5 is a fragmentary end elevation of the positioning lug and latch. The view is taken in the direction indicated by the arrow 5 in Fig. 2.

All views are drawn to a scale approximately ⅗ actual size.

In restaurants and delicatessens where a major profit item is the dispensing of food products such as pies, cakes and form cheese in portions or sectors, it is of great importance to be able to cut a round shape into any desired number of equal sectors. To cut a pie into fourths semi-accurately is not too difficult, but to cut it into five, seven or nine equal sectors is very difficult, and generally results in five, seven or nine sectors each of a different size. Often the last piece cut is just a sliver and cannot be sold, or if sold, it must be sold at a reduced price.

To obviate this problem, I have provided a device which broadly comprises a base on which is mounted a rotatable turntable adapted to hold, and provided with means for, centering the pie thereon while it is being cut. Means are provided for interrupting rotation of the turntable at predetermined positions corresponding to the number of sectors into which the pie is to be divided. Means are also provided for guiding the knife in making the cuts.

In greater detail, and referring now to the drawings, the device of my invention comprises a base 2, preferably of cast aluminum, and provided with a relatively large diameter supporting rim 3 tapering upwardly to a truncated section 4 having a vertical bore 6 therethrough.

To secure the base against movement while the device is being used, means are provided for clamping the base to a support 7, such as a table top, shown in dash lines in Fig. 1. Formed integrally on the base are spaced lugs 8 having a pin 9 extending therebetween. The pin passes through the slot 12 formed in the terminal end 13 of a screw clamp 14. A slot 17 in the base between the lugs allows passage of the terminal end of the clamp to retain it in a position of disuse, such as for storing.

Forming a press fit in the bore 6 in the base is a bushing 18, projecting upwardly therefrom beyond the base, and adapted to be pressed into the central bore 19 formed in the horizontally extending bar 21. The bushing is preferably machined from brass or bronze bar stock, and provides a convenient means for fixedly mounting the bar 21 on the base. The bushing also forms a bearing for the integrally formed journal pin 22 centrally located on the superimposed turntable 23. A washer 24, held by a cap screw 26, retains the parts in position while permitting rotation of the turntable.

Means are provided on the underside of the turntable, cooperating with means on the bar 21, for interrupting rotation of the turntable at selected intervals. As shown in Figs. 1 and 3, the underside of the turntable is provided with a short radially extending groove 31 formed adjacent its outer periphery. When the turntable is in the position shown in Figs. 1 and 2, which may be referred to as the starting position, as indicated by the legend 32 embossed on the upper face of the turntable, the long axis of the groove parallels the long axis of the bar 21.

In this position of the parts, the groove is engaged by a detent ball 33 held in the upper end of a vertical bore 34 formed in the pillar extension 36 of a selector block 37, slidably mounted on the machined outer end 38 of the bar 21. A second detent ball 39 in the lower end of the bore 34 is adapted to selectively engage one of several depressions 41 spaced longitudinally along the top surface 42 of the bar 21. A spring 43 interposed between the detent balls resiliently presses them outwardly into engagement with the turntable and the bar while permitting withdrawal of the detent balls into the bore 34.

As shown in Fig. 1, the selector block 37 is provided with a laterally extending selector arm 44 adapted to indicate by means of the indicia 46, the number of sectors into which the pie is to be cut. The indicia is preferably stamped on a strip of metal 46 in the upper surface of the bar.

In Figs. 1 and 2, the detent ball 39 is shown engaged in the right end depression 41, and by reference to Fig. 2, it will be seen that with the ball thus engaged, the selector arm is set to indicate the numeral "4" on the strip 46. This indicates that the device is set to cut the pie into fourths. Movement of the selector arm to indicate the numeral "5" automatically engages the ball 39 in the next succeeding depression, and the device will then be set to cut the product into five equal sectors.

With the selector block positioned as shown, rotation of the turntable by hand forces the upper detent ball 33 into the bore 34, allowing the turntable to rotate uninterrupted until the detent ball falls into the first of a series of three depressions 48 formed in the underside of the turntable and positioned circumferentially 90° apart. It will be understood that the radial distance of each of the depressions 48 from the central axis 49 of the device, is equal to the distance between the central axis and the detent balls 33 and 39 in the position shown.

When the selector block is set as previously described to cut the product into five sectors, the detent ball 33 permits uninterrupted rotation of the turntable until the detent ball 33 falls into the first of a series of four depressions 50, formed in the underside of the turntable and positioned circumferentially 72° apart. It will be understood that for each setting of the indicator block, a separate series of depressions is provided on the underside of the turntable. The number of separate depressions in each series is always one less than the numeral indicated, since the groove 31 occupies a position common to one depression out of each series. Thus, with the indicator block indicating the numeral "7," the detent ball 33 will successively fall into the depressions 51 spaced circumferentially 51.42° apart; at setting numeral "8," the depressions 52 are spaced 45° apart; at setting numeral "9," the depressions 53 are 40° apart; at setting numeral "10," the depressions 54 are 36° apart; and at setting numeral "18," the depressions 56 are only 20° apart. For the sake of clarity in the drawing, the depressions making up each series are connected by a center line, and only one depression in each series is assigned a reference number. For convenience, each of the depressions or sockets 41 and 48—56, and the engaging balls 39 and 33 function as mutually engaging selective stops to which resilience of engagement is given by the spring 43.

It will be understood that while the device illustrated is provided with seven series of depressions corresponding to the numerals 4, 5, 7, 8, 9, 10 and 18, as indicated on the strip 46, a different arrangement may be provided as desired.

Means are provided on the turntable to center the pie or cake and to hold it in position while it is being cut.

Interposed between the turntable and the bar 21 thereunder is an annular plate 61 journaled on the centrally located pin 22 formed integrally on the underside of the turntable. Adjacent its outer periphery, the plate is provided with three small apertures spaced circumferentially therearound at 120° intervals. Each aperture is adapted to receive the downwardly extending pivot pin 62 formed on the horizontally extending drag link 63 underlying the turntable. At its outer end, each drag link is provided with an upwardly extending integral pin 64. The pin 64 makes a close sliding fit in the radial slot 66 formed in the turntable, and extends therethrough to be fixed at its upper end to the carriage plate 67 slidable on the top surface of the turntable. Each carriage plate overlies a radial slot 66, and together they support the pie, which is placed thereon generally contained in a pie tin or form, not shown. Upwardly extending centering and holding notched pins 68 fixed on the outer ends of the carriage plates clamp against the periphery of the pie tin to hold it and the pie in position.

To control movement of the carriage plates inward or outward as desired, means are provided for rotating the plate 61 to effect sliding of the pins 64 in the slots 66, with consequent inward or outward movement of the carriage plates and pins 68.

Interposed between the turntable and the plate 61, and like the plate, journaled on the pin 22, is an annular control ring 71 provided with an integral and radially extending lever arm 72 underlying the turntable. At its outer end the arm 72 is connected, as by screws 73, to a short auxiliary lever arm 74 passing through the circumferentially extending slot 76 formed in the turntable. After passing through the slot, the auxiliary arm continues radially along the top surface of the turn-table and terminates adjacent the outer periphery thereof. The outer end of the arm is provided with an upwardly extending lug 77 adapted to be grasped with the fingers; and a spring pressed pivotally mounted latch 78 adapted to selectively engage one of the circumferentially spaced and radially extending grooves 79 formed in the top surface of the turntable adjacent its periphery.

Rotative movement is imparted to the plate 61 by digital manipulation of the arm and latch. As shown in Fig. 3, pivotal movement of the arm results in a tensive force being applied to the spring 80, which is connected by means of pins 81 and 82, between the plate 61 and arm 72 respectively. Thus, inward travel of the carriage plates is controlled by the diameter of the pie tin placed thereon, while the inward pressure exerted by the pins 68 is controlled by tension in the spring 80. Tension in the spring is of course determined by the degree of arcuate movement of the lever arm 72. It is thus possible to vary the inward pressure exerted by the centering and holding pins in accordance with the delicacy of the product being cut.

Means are provided for guiding the knife in making the cuts. Overlying the turntable is a horizontal and normally diametrically extending guide arm 86, mounted for pivotal movement on the upwardly extending cylindrical bearing portion 87 formed integrally on one end of the horizontally extending bar 21. The vertical shaft 88, which forms the journal for the guide arm is provided for a portion of its length with a groove 89, one face 91 of which acts as a cam face, while the other angularly disposed face 92 acts as a stop. As shown best in Fig. 4, the groove is adapted to be engaged by the correspondingly shaped end of a detent pin 93, slidably contained in the bore 94 running longitudinally of the bar 21, and communicating with the bore of the bearing portion 87. A spring 95 enclosed in the bore behind the detent pin holds the pin in resilient engagement with the groove. Collars 96 above and below the bearing portion clamp to the shaft 88 and provide a means of adjusting the vertical height of the guide arm above the turntable.

It will thus be seen that pressure exerted on the guide arm in a counterclockwise direction will effect compression of the spring and retraction of the detent pin into the bore 94. When one complete revolution has been made, the pin will again engage the groove and the guide bar will be positioned diametrically over the center of the turntable. Movement of the guide arm in a clockwise direction is prevented by the stop face 92 impinging on the complementary surface of the detent pin.

Passing vertically through a bore 97 in the guide arm or frame, and overlying the exact center of the turntable, is a slotted center pin 98, pointed at its lower end and provided with a head 99 at its upper end. A slot 101 extends the full length of the pin and is engaged by the resilient clip 102 which projects into the bore 97. The slotted pin performs the double function of locating the exact center of the pie and providing a guide for the initial insertion of the knife point in commencing each cut. The blade of the knife during the remainder of the cutting operation is guided by the flat surface 103 formed in the guide arm and extending from the pin to the outermost free end thereof.

Thus, in cutting a pie, the point of the knife is inserted into the slot 101 and guided downwardly until it strikes the tin in which the pie is contained. The blade of the knife is held flat against the flat surface 103 of the arm, and the knife drawn outwardly to make the first cut. The turntable is then grasped along its periphery and rotated, preferably counterclockwise by a right handed man, until the detent ball 33 drops into the first depression of whatever series the indicator block is set for. The pie is now in position for the second cut, the knife is inserted and the cut made. When one complete revolution has been made, the pie will have been divided into the desired number of equal sectors. To facilitate grasping the turntable, the periphery is provided with a downwardly extending scalloped flange 104 which conveniently accommodates the fingers.

I claim:

1. A device to facilitate knife cutting of pies into a selected number of equal sectors comprising, a base, a turntable journaled on the base, means on the turntable for centering and holding thereon the pie to be cut, selector means on the base for selecting the number of sectors to be cut, means on the underside of the turntable correlated with said selector means for interrupting rotation of the turntable at equal intervals defining the size of the sectors, said means being automatically released in response to further rotation of the turntable, guide means on the base rotatable horizontally and spaced above the turntable for guiding the knife in making the cuts, and a spring pressed detent pin interposed between the base and the guide means to normally limit rotation of said guide means in one direction and to retain the guide means in operative position.

2. A device to facilitate knife cutting of pies into a selected number of equal sectors comprising, a base, a turntable journaled on the base, means on the turntable for centering and holding thereon the pie to be cut, a plurality of concentric series of circumferentially equally spaced sockets on the underside of the turntable, a single series of sockets on the base equal in number to the number of concentric series of sockets and spaced apart equal to the radial spacing of the concentric series of sockets and extending transversely thereacross, and resiliently pressed means adjustably movable to seat simultaneously in a selected socket of the single series and one of the sockets in the corresponding concentric series.

3. A device to facilitate knife cutting of pies into a selected number of equal sectors comprising, a base, a turntable journaled on the base, means on the turntable for centering and holding thereon the pie to be cut, a plurality of concentric series of circumferentially equally spaced sockets on the underside of the turntable, a single series of sockets on the base equal in number to the number of concentric series of sockets and spaced apart equal to the radial spacing of the concentric series of sockets and extending transversely thereacross, and resiliently pressed stop means adjustably movable to selectively correlate each of said concentric series of stop sockets with a selected corresponding stop socket of the single series.

References Cited in the file of this patent

UNITED STATES PATENTS

| | | |
|---|---|---|
| 875,737 | Roberts | Jan. 7, 1908 |
| 1,800,706 | Turnquist | Apr. 14, 1931 |